United States Patent
Lamers

(10) Patent No.: US 8,562,716 B2
(45) Date of Patent: Oct. 22, 2013

(54) DEVICE AND METHOD FOR DEGASSING A LIQUID

(75) Inventor: Antonius Gerardus Wilhelmus Maria Lamers, Asten (NL)

(73) Assignee: Spiro Enterprises B.V., St. Anthonis (NL)

( * ) Notice: Subject to any disclaimer, the term of this patent is extended or adjusted under 35 U.S.C. 154(b) by 194 days.

(21) Appl. No.: 13/055,107

(22) PCT Filed: Jul. 24, 2008

(86) PCT No.: PCT/NL2008/050509
§ 371 (c)(1), (2), (4) Date: Mar. 23, 2011

(87) PCT Pub. No.: WO2010/011130
PCT Pub. Date: Jan. 28, 2010

(65) Prior Publication Data
US 2011/0168017 A1 Jul. 14, 2011

(51) Int. Cl.
*B01D 19/00* (2006.01)
(52) U.S. Cl.
USPC ......... 95/24; 95/260; 95/244; 96/200; 96/165
(58) Field of Classification Search
USPC .................. 95/260, 24, 244; 96/200, 165
See application file for complete search history.

(56) References Cited

U.S. PATENT DOCUMENTS

| | | | | |
|---|---|---|---|---|
| 1,618,424 A | * | 2/1927 | Gibson ........................... | 96/200 |
| 2,078,288 A | * | 4/1937 | Sherman ........................ | 95/244 |
| 2,315,481 A | * | 3/1943 | Drewry et al. .................. | 95/244 |
| 2,379,753 A | * | 7/1945 | Sebald ........................... | 210/712 |
| 2,395,697 A | * | 2/1946 | Tidd ............................... | 237/63 |
| 2,677,433 A | * | 5/1954 | Kretzschmar .................. | 95/244 |
| 2,710,664 A | * | 6/1955 | Blackmore et al. ............. | 96/156 |

(Continued)

FOREIGN PATENT DOCUMENTS

DE 87 17 347 U1 9/1988
DE 198 10 005 A1 9/1998
(Continued)

OTHER PUBLICATIONS

International Search Report for PCT/NL2008/050509, mailed Jun. 5, 2009.

(Continued)

*Primary Examiner* — Duane Smith
*Assistant Examiner* — Douglas Theisen
(74) *Attorney, Agent, or Firm* — Novak Druce Connolly Bove + Quigg LLP

(57) ABSTRACT

A method for degassing a liquid of a substantially closed liquid circulation system at a working pressure may include passing at least a partial flow of the liquid through a restriction into a chamber in which a degassing pressure is maintained, the degassing pressure being higher than atmospheric pressure and lower than the working pressure; separating gas withdrawn from the partial flow of liquid from the partial flow; removing the gas from the chamber; and pumping the degassed partial flow of the liquid back into the substantially closed circulation system. The restriction may include a nozzle, and the step of passing at least the partial flow of the liquid through the restriction into the chamber may include spraying at least the partial flow of the liquid through the nozzle into the chamber for obtaining a jet and/or mist of the liquid in the chamber.

12 Claims, 2 Drawing Sheets

(56) References Cited

U.S. PATENT DOCUMENTS

| | | | | |
|---|---|---|---|---|
| 2,713,973 | A | * | 7/1955 | Hencken et al. ............... 237/63 |
| 3,096,166 | A | * | 7/1963 | Kolthof et al. ................. 96/203 |
| 3,271,933 | A | * | 9/1966 | Harker et al. .................. 96/214 |
| 3,276,187 | A | * | 10/1966 | Harker et al. .................. 96/214 |
| 3,362,132 | A | * | 1/1968 | Schellenberg ................... 95/19 |
| 3,377,778 | A | * | 4/1968 | Gaertner ........................ 95/260 |
| 5,266,481 | A | | 11/1993 | Wegner et al. |

FOREIGN PATENT DOCUMENTS

| | | | |
|---|---|---|---|
| DE | 1981005 A1 | * | 9/1998 |
| EP | 0 187 683 B1 | | 7/1986 |
| EP | 0187683 A2 | * | 7/1986 |
| EP | 0 652 406 A1 | | 5/1995 |
| EP | 0652406 A1 | * | 5/1995 |
| EP | 0 933 109 A2 | | 8/1999 |
| GB | 2 235 138 A1 | | 2/1991 |
| WO | 97/14922 A1 | | 4/1997 |
| WO | WO97/14922 | * | 4/1997 |

OTHER PUBLICATIONS

Communication from the European Patent Office re EP Application No. 08 779 055.6 (Dec. 16, 2011).

* cited by examiner

DEVICE AND METHOD FOR DEGASSING A LIQUID

CROSS-REFERENCE TO RELATED APPLICATIONS

This application is filed under 35 U.S.C. 371 as a U.S. national phase application of PCT/NL2008/050509, having an international filing date of 24 Jul. 2008, which is hereby incorporated by reference.

TECHNICAL FIELD

The invention relates to a method for degassing a liquid of a substantially closed liquid circulation system at a working pressure, comprising passing at least a partial flow of the liquid through a restriction into a chamber in which a degassing pressure is maintained, the degassing pressure being higher than atmospheric pressure and lower than the working pressure, separating gas withdrawn from the partial flow of liquid from the partial flow, removing the gas from the chamber, and pumping the degassed partial flow of the liquid back into the substantially closed circulation system.

BACKGROUND

Such method is known from DE 198 10 005. In the known method a partial flow of heating water of a heating system is passed over a pressure relieve valve into a degassing apparatus in which, by pre-adjustment of the valve, an overpressure of 0.1 to 0.3 bar is maintained. The degassing apparatus comprises inserts for increasing the surface at which gas may be separated from the heating water. A float valve is used for removing the gas separated from the heating water out of the degassing apparatus into the atmosphere. The degassed heating water is fed back into the heating system.

SUMMARY

It may be desirable to provide an improved method for degassing a liquid of a substantially closed liquid circulation system at a working pressure. More specifically an object of the invention is to provide a method of degassing which allows more gas to be removed from the liquid, e.g. per unit time.

Thereto, according to the invention, the restriction comprises a nozzle, and the step of passing at least the partial flow of the liquid through the restriction into the chamber comprises spraying at least the partial flow of the liquid through the nozzle into the chamber for obtaining a jet and/or mist of the liquid in the chamber. The chamber is, thereto, at least during normal use, at most partially filled with the liquid, so that the liquid can be sprayed into a gas head in the chamber.

This provides the advantage that the surface area of the liquid is largely increased when the liquid enters the chamber at the degassing pressure which is higher than atmospheric pressure and lower than the working pressure. Thus, degassing of droplets in the mist or degassing of the jet can be achieved more efficiently. Moreover, the method still provides for simple control of the degassing process, since only the degassing pressure needs to be maintained and no complicated controls are required.

Preferably, the chamber is at most partially filled with the liquid, and the nozzle is situated at a level higher than the liquid level. Hence it is easily assured that the liquid is sprayed effectively.

In an embodiment, the method comprises adjusting a pump rate of the pump such that the liquid level is maintained substantially constant and/or such that the degassing pressure is maintained substantially constant. Thus the process of degassing can be controlled with a very simple setting of one parameter.

Preferably, the solubility of gas in the liquid is lowest inside the chamber. Thereto, preferably the degassing pressure inside the chamber is close to atmospheric pressure. Preferably, the degassing pressure is 0.1 to 0.5 bar higher than atmospheric pressure. Nevertheless, the degassing pressure may, in certain cases be more than 0.5 bar higher than atmospheric pressure. It will be appreciated that the temperature of the liquid in the chamber when being degassed also influences the solubility of the gas in the liquid.

It is also possible that the degassing pressure is a predetermined amount lower than the working pressure, i.e. a predetermined pressure drop is experienced over the nozzle. Also in this case, the degassing pressure is higher than atmospheric pressure and lower than the working pressure.

The invention also provides a device for degassing a liquid of a substantially closed liquid circulation system at a working pressure, comprising a chamber, a restriction, in fluid communication with the chamber for passing at least a partial flow of the liquid through the restriction into the chamber, a pump for maintaining a degassing pressure in the chamber and feeding the liquid back into the substantially closed liquid circulation system, the degassing pressure being higher than atmospheric pressure and lower than the working pressure, and an automatic valve for removing gas separated from the liquid out of the chamber when the amount of gas inside the chamber exceeds a predetermined amount, wherein the restriction comprises a nozzle for spraying at least the partial flow of the liquid through the nozzle into the chamber for obtaining a jet and/or mist of the liquid in the chamber.

This device also provides the advantage that the surface area of the liquid is largely increased when the liquid enters the chamber at the degassing pressure which is higher than atmospheric pressure and lower than the working pressure. Thus, degassing of droplets in the mist or degassing of the jet can be achieved efficiently. Moreover, the device provides for simple control of the degassing process, since only the degassing pressure needs to be maintained and no complicated controls are required. In fact, the device may be free of control means for automatically, e.g. alternatingly, varying the pressure in the chamber. The device may even be arranged for keeping the pressure in the chamber substantially constant.

Preferably, the nozzle is situated in an upper part of the chamber. Thus, the liquid may be efficiently sprayed into a gas head inside the chamber for efficient degassing of the liquid.

Preferably, the nozzle is arranged to spray in a direction away from the liquid surface in the chamber. The sprayed liquid then may have a long free pathway in the chamber, allowing for efficient removal of gas from the liquid droplets of jet. Also, the nozzle may be arranged to spray the jet of the liquid towards an inner wall of the chamber, wherein the jet, upon impingement on the inner wall, will break up in small droplets for efficient degassing.

BRIEF DESCRIPTION OF THE DRAWINGS

The invention will now be further elucidated by means of a, non-limiting, example referring to the accompanying drawing. Herein

DETAILED DESCRIPTION

Figure 1:
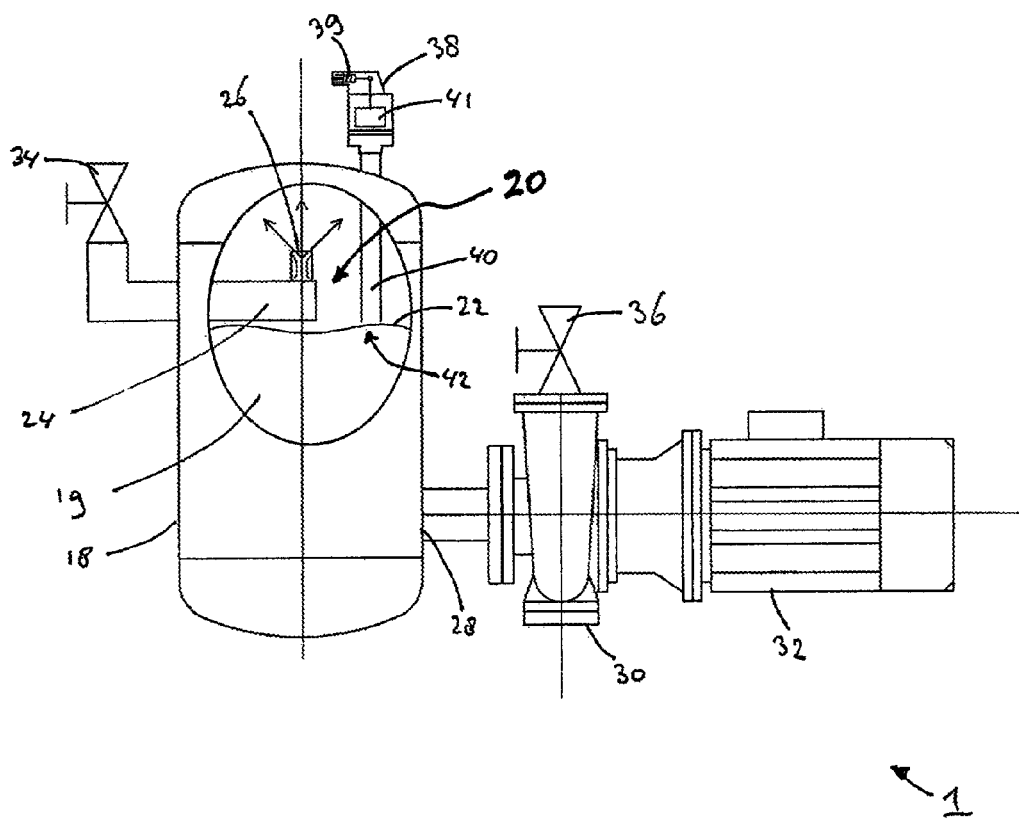
FIG. 1 shows an example of an embodiment of a degassing device according to the invention.
Figure 2:
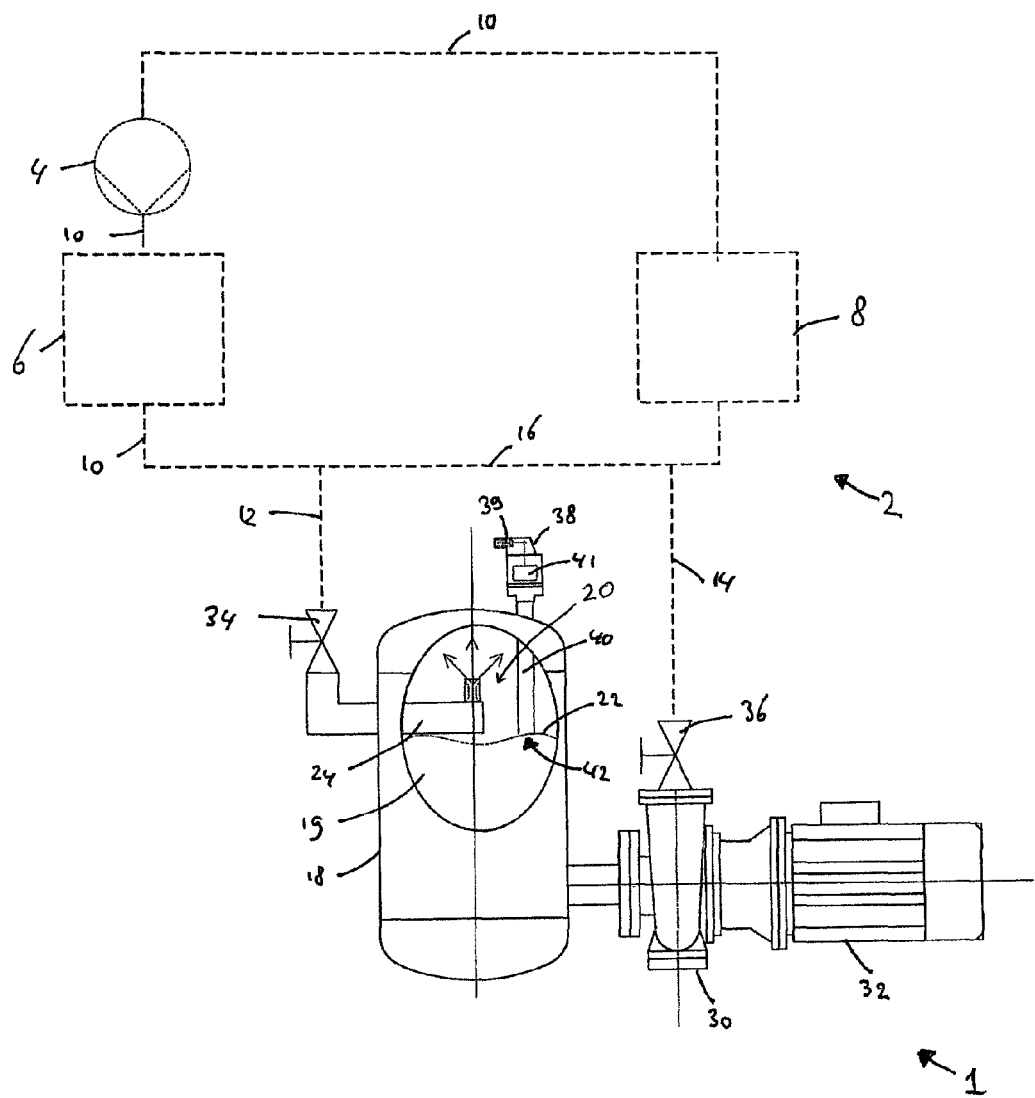
FIG. 2 shows an example of an embodiment of a degassing device according to the invention in combination with a substantially closed liquid circulation system.

FIG. 1 shows an example of an embodiment of a degassing device 1 according to the invention. FIG. 2 shows an example of an embodiment of a degassing device according to the invention in combination with a substantially closed liquid circulation system. In FIG. 2 the substantially closed liquid circulation system 2 comprises a pump 4, a boiler 6, a radiator 8 and piping 10 connecting the pump 4, boiler 6 and radiator 8. The circulation system 2 in this example constitutes a heating system for heating surroundings of the radiator 8. It will be appreciated that the circulation system 2 may also constitute a cooling system. In that case, the boiler 6 may be replaced by a chiller and the radiator 8 may be replaced by a heat exchanger.

In the example of FIG. 2 the degassing device 1 is connected to the circulation system 2 by means of pipes 12 and 14. Via the pipe 12 liquid is drawn from the circulation system 2 into the degassing device 1. Via the pipe 14 degassed liquid is fed back into the circulation system 2 from the degassing device 1. In this example, a liquid flow path through the degassing device 1 forms a branch parallel to a portion 16 of the substantially closed circulation system 2.

Referring to FIGS. 1 and 2, the device 1 comprises a chamber 18. A wall of the chamber 18 is shown partially broken away for clarity. Liquid received from the circulation system 2 is fed into the chamber 18. In this example the liquid is fed into the chamber 18 via a feed pipe 24. The feed pipe 24 comprises a nozzle 26 for dispensing the liquid into the chamber 18. Inside the chamber 18 a quantity, or bulk 19, of liquid accumulates. In FIGS. 1 and 2 the chamber 18 comprises a gas head 20 above the level 22 of the liquid inside the chamber 18.

The chamber 18 further comprises an outlet 28 which is in fluid communication with a pump 30. In this example the pump 30 is driven by an electric motor 32. From the pump, the liquid is fed back into the circulation system 2 via the pipe 14.

In the example of FIG. 2, the degassing device 1 is connected to the circulation system 2 via an entrance valve 34 and an exit valve 36.

The degassing device 1 further comprises an automatic valve 38 for removing gas separated from the liquid out of the chamber 18. In the example of FIGS. 1 and 2, the automatic valve 38 comprises a rise pipe 40 and a float operated valve 39 having a float 41. The float operated valve 39 prevents liquid from leaving the chamber via the automatic valve 38, by closing the float operated valve 39 in case the liquid level rises to such an extent that it lifts the float 41.

The degassing device 1 as discussed thus far can be operated as follows.

The pump 30 is operated to decrease a pressure inside the chamber 18 to obtain degassing pressure. The degassing pressure is higher than the atmospheric pressure surrounding the degassing device 1 and lower than the working pressure of the liquid inside the circulation system 2. The working pressure inside the circulation system 2 may span a range of pressures. The pressure just downstream of the pump may be higher than the pressure in the radiator. Preferably the degassing pressure is lower than the lowest working pressure inside the circulation system 2, since degassing is performed most efficient at the point of lowest pressure within the assembly of the degassing device 1 and the circulation system 2.

Since the degassing pressure inside the chamber is lower than the working pressure inside the circulation system 2, liquid will be sucked from the circulation system 2 via the pipe 12 and the feed pipe 24 and the nozzle 26 into the chamber 18. At the nozzle 26 a mist of the liquid is generated. In this example, the nozzle 26 generates a full cone of the mist. This mist is sprayed into the gas head 20 which is at the degassing pressure. Since the degassing pressure is lower than the working pressure, the droplets of liquid in the mist will be efficiently degassed. The gas removed from the droplets accumulates in the gas head 20. The degassed liquid flows into the bulk 19 of liquid in the chamber 18. From the partially liquid-filled chamber 18 the degassed liquid is pumped, via pump 30 back into the circulation system 2.

It has been found that, e.g. upon start-up of the degassing device, the chamber may be substantially completely filled with the liquid. Nevertheless, the liquid will also then be degassed inside the chamber 18, so that the gas head 20 is created automatically.

In this example, the gas head 20 accumulating in the chamber 18 will displace the bulk 19 of degassed liquid in the chamber 18. As a result, the liquid level 22 will sink. Once the liquid level 22 falls below an entry opening 42 of the rise pipe 40, gas will enter the rise pipe 40. In this example the float operated valve 39 will be in an open position to allow the gas to escape from the chamber 18, as long as the liquid level 22 inside the chamber 18 allows such escape. It will be appreciated that since the degassing pressure is chosen to be higher than the atmospheric pressure, the gas can actually escape from the chamber 18 due to this pressure difference.

The escape of gas will cause the liquid level 22 inside the chamber 18 to rise. This may in turn cause the entry opening 42 of the rise pipe 40 to be closed again for the gas, since it gets under the level of the liquid inside the chamber 18. Once the rise pipe 40 is closed, gas will start to accumulate in the head 20 again and the cycle repeats itself.

It will be appreciated that the above degassing process in the degassing device 1 is self-regulating. Thus, complex controls are not required. In a very simple embodiment, the nozzle 26 provides a fixed pressure drop smaller than difference between the working pressure and atmospheric pressure. Thus, no controls are required. In such embodiment, the entrance valve 34 and an exit valve 36 may be omitted. In other cases adjustment of the flow and/or the degassing pressure is possible by means of adjusting the entrance valve 34 and/or the exit valve 36, and/or by means of adjusting a pump rate of the pump 30 (e.g. in case of a frequency controlled pump). This adjusting can be done manually or automatically (e.g. employing one or more pressure and/or flow sensors). Manual adjustment may be quite coarse, so that in most cases manual adjustment will be sufficient for attaining the desired equilibrium and no automatic control is required.

Thus, the degassing device 1 is easy to operate. Apart from the one-time settings of the pump rate of the pump 30 and/or flow resistance of the entrance valve 34 and/or exit valve 36, no active controls are required.

Preferably, a pressure drop over the nozzle 26 is larger than a pressure drop over the entrance valve 34. The pressure drop over the nozzle 26 creates the droplets of the mist of the liquid. A large pressure drop over the nozzle 26 may create smaller droplets, thus improving degassing efficiency due to decreased gas diffusion distances within the droplets. The pressure drop over the entrance valve 34 may be used to adapt the device 1 to any working pressure in the circulation system 2.

There is no need for automatically, e.g. alternatingly, varying the pressure in the chamber 18, since this is all performed by the self-adjusting equilibrium. Thus a very simple degassing device 1 may be obtained. The degassing device may be free of active controls. The degassing device may, for instance, be free from active controls for automatically, e.g. alternatingly, varying the pressure in the chamber 18, e.g. by switching the pump 30 on and off alternatingly.

Instead, no controls at all are required. It will be appreciated that also passive controls may be employed. It is for instance possible to use a passive pressure control valve (set-pressure valve) as the entrance valve 34 in order to set the degassing pressure inside the chamber 18, or a passive flow control valve as the entrance valve 34 to set the flow together with the manually adjustable exit valve 36.

The valve 38 for removing gas separated from the liquid out of the chamber 18 may comprise a flow switch. The flow switch may be arranged for switching off the pump 30 to avoid degassing when a low gas concentration is present in the liquid. Degassing a liquid containing little gas yields only a small flow of gas through the valve 38. The flow switch may be arranged to switch off the pump 30 when the flow of gas is below a predetermined threshold level. Hence, unnecessary energy consumption may be avoided in case the liquid contains little gas and a relatively limited degree of degassing is to be expected.

In the foregoing specification, the invention has been described with reference to specific examples of embodiments of the invention. It will, however, be evident that various modifications and changes may be made therein without departing from the broader spirit and scope of the invention as set forth in the appended claims.

In the examples, the feed pipe 24 comprises a single nozzle 26. It will be appreciated that it is also possible that the feed pipe comprises a plurality of nozzles. In the examples, the nozzle 26 is arranged to generate a mist of the liquid. It will be appreciated that the nozzle(s) may also be arranged to generate a jet, such as a sheet, of the liquid. The jet will also be degassed in the head 20 of the chamber 18. If the jet impinges on a wall of the chamber, droplets of the liquid may be generated which are efficiently degassed.

In the examples, the nozzle sprays the liquid in an upward direction. It will be appreciated that any direction is, in principle, possible.

It is possible that a pressure inside the chamber is controlled by a closed loop, e.g. comprising a pressure sensor, a control unit and the pump 30.

In the example of FIG. 2 the device is used for degassing a heating system. It will be appreciated that the device may also be used for degassing in a cooling system, e.g. comprising a chiller and/or fancoils.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. Method for degassing a liquid of a substantially closed liquid circulation system at a working pressure, comprising
passing at least a partial flow of the liquid through a restriction into a chamber,
allowing the chamber to become partially filled by the partial flow of liquid with a gas head above a level of the liquid accumulated inside the chamber,
maintaining a degassing pressure in the chamber, the degassing pressure being higher than atmospheric pressure and lower than the working pressure,
separating gas withdrawn from the partial flow of liquid from the partial flow,
removing the gas from the chamber, and
pumping the degassed partial flow of the liquid back into the substantially closed circulation system,
wherein the restriction comprises a nozzle, and the step of passing at least the partial flow of the liquid through the restriction into the chamber comprises
spraying at least the partial flow of the liquid through the nozzle into the chamber for obtaining a jet or a mist of the liquid in the chamber, wherein the step of removing the gas from the chamber is effected via a rise pipe having an entry opening allowing escape of gas when the liquid level is below the entry opening and allowing the gas to accumulate in the head when the liquid level is above the entry opening.

2. Method according to claim 1, wherein the chamber is at most partially filled with the liquid, and the nozzle is situated at a level higher than the liquid level.

3. Method according to claim 1, wherein the step of removing the gas from the chamber is effected via a float valve.

4. Method according to claim 1, comprising
adjusting a pump rate of the pump such that the degassing pressure is maintained substantially constant.

5. Method according to claim 1, comprising
adjusting a pump rate of the pump such that the liquid level is maintained substantially constant.

6. Method according to claim 1, wherein the degassing pressure is 0.1 to 0.5 bar higher than atmospheric pressure.

7. Device for degassing a liquid of a substantially closed liquid circulation system at a working pressure, comprising
a chamber for being partially filled by a liquid with a gas head above a level of the liquid accumulated inside the chamber,
a restriction, in fluid communication with the chamber for passing at least a partial flow of the liquid through the restriction into the chamber,
a pump for maintaining a degassing pressure in the chamber and feeding the liquid back into the substantially closed liquid circulation system, the degassing pressure being higher than atmospheric pressure and lower than the working pressure, and
an automatic valve for removing gas separated from the liquid out of the chamber when the amount of gas inside the chamber exceeds a predetermined amount,
wherein the restriction comprises a nozzle for spraying at least the partial flow of the liquid through the nozzle into the chamber for obtaining a jet or a mist of the liquid in the chamber,
the device further comprising a rise pipe for removing the gas from the chamber, the rise pipe having an entry opening allowing escape of the gas when the liquid level is below the entry opening and allowing the gas to accumulate in the head when the liquid level is above the entry opening.

8. Device according to claim 7, wherein the nozzle is situated in an upper part of the chamber.

9. Device according to claim 7, wherein the nozzle is arranged to spray in a direction away from the liquid surface in the chamber.

10. Device according to claim 7, wherein the automatic valve for removing gas comprises a flow switch arranged for switching off the pump to avoid degassing when the flow of gas is below a predetermined threshold level.

11. Heating or cooling system comprising a substantially closed liquid circulation system at a working pressure and a device for degassing according to claim 7.

12. Heating or cooling system according to claim 11, wherein a liquid flow path through the device for degassing forms a branch parallel to a portion of the substantially closed circuit.

\* \* \* \* \*

UNITED STATES PATENT AND TRADEMARK OFFICE
CERTIFICATE OF CORRECTION

PATENT NO. : 8,562,716 B2  
APPLICATION NO. : 13/055107  
DATED : October 22, 2013  
INVENTOR(S) : Antonius Gerardus Wilhelmus Maria Lamers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 255 days.

Signed and Sealed this

Fifteenth Day of September, 2015

Michelle K. Lee
*Director of the United States Patent and Trademark Office*